United States Patent [19]

Horian et al.

[11] 4,232,871
[45] Nov. 11, 1980

[54] MANUAL RECORD CLEANER

[76] Inventors: Richard C. Horian, 27234 Westland, Detroit, Mich. 48240; James G. Horian, 7340 Indiana, Dearborn, Mich. 48126

[21] Appl. No.: 737,295

[22] Filed: Nov. 1, 1976

[51] Int. Cl.³ .............................................. G11B 3/58
[52] U.S. Cl. ........................................ 274/47; 15/114
[58] Field of Search ............. 274/47; 15/1.5 A, 1.5 R, 15/160, 184, 210 R, 224, 114, 104.92

[56] References Cited

U.S. PATENT DOCUMENTS

| | | | |
|---|---|---|---|
| 754,900 | 3/1904 | Seith et al. | 15/114 UX |
| 1,957,591 | 5/1934 | Heckert | 15/1.5 A |
| 2,976,551 | 3/1961 | Watts | 274/47 |
| 3,472,517 | 10/1969 | Shimono | 274/47 |
| 3,534,425 | 10/1970 | Watts | 15/160 |

FOREIGN PATENT DOCUMENTS

| | | | |
|---|---|---|---|
| 71425 | 8/1950 | Denmark | 274/47 |
| 730595 | 4/1951 | Fed. Rep. of Germany | 15/1.5 A |
| 1167055 | 4/1964 | Fed. Rep. of Germany | 274/47 |
| 1070323 | 2/1954 | France | 15/114 |
| 348792 | 10/1960 | Switzerland | 15/1.5 A |
| 643925 | 9/1950 | United Kingdom | 274/47 |

*Primary Examiner*—Harry N. Haroian
*Attorney, Agent, or Firm*—Reising, Ethington, Barnard, Perry & Brooks

[57] ABSTRACT

A manual record cleaner that is manually grasped and engaged with a rotating record to provide effective cleaning of the record grooves as well as removal of static electrical charge from the record. A body of the cleaner includes rigid leading and trailing projections spaced from each other and having coverings of a soft pile for cleaning the records. A receptacle mounts the cleaner and has a first compartment that receives the leading projection and a second compartment that receives the trailing projection. Within the first compartment, an absorbent material is mounted on the receptacle in a spaced relationship from the pile covering of the leading projection so that cleaning liquid applied thereto creates an atmosphere that dampens the leading projection pile covering the proper amount. Static charge on a record being cleaned and dust accumulation are removed by the dampened leading projection while the dry trailing projection removes any remaining dust accumulation. A brush and a static charge dissipating member are mounted on the body between the leading and trailing projections. Bristles of the brush extend from the body a slightly greater distance than the projections so as to loosen dust accumulation within the record grooves. The charge dissipating member extends from the body a slightly lesser distance than the projections so as to be spaced relative to records being cleaned and thereby functions in removing static electrical charge from the records.

14 Claims, 5 Drawing Figures

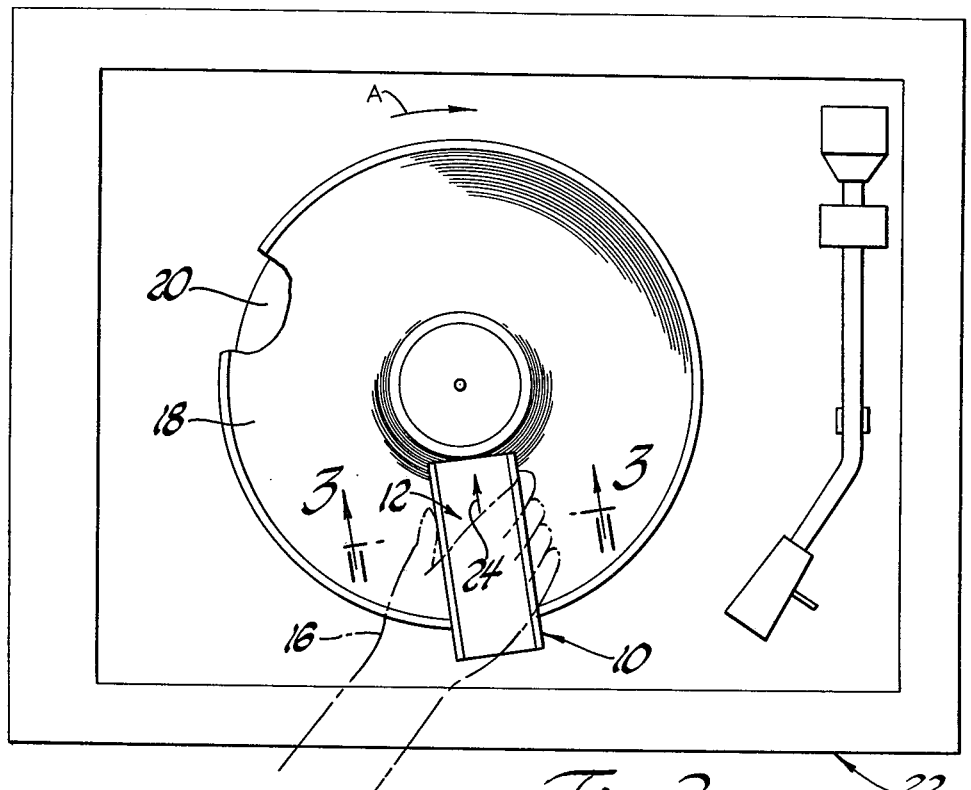
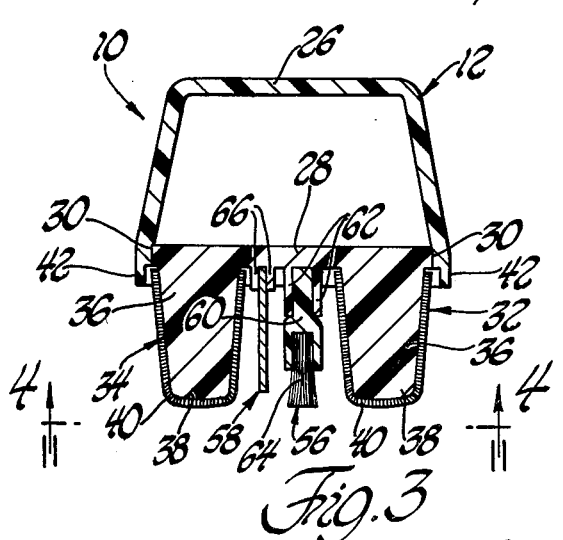
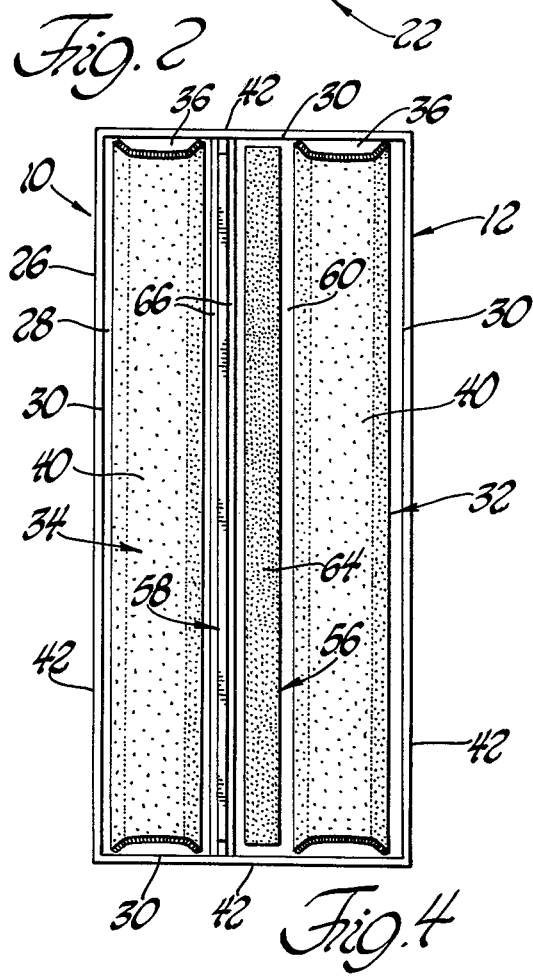
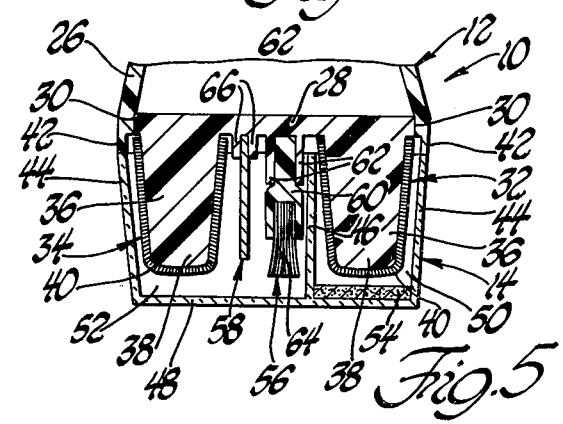
Fig. 2
Fig. 3
Fig. 4
Fig. 5

MANUAL RECORD CLEANER

BACKGROUND OF THE INVENTION

1. Field of the Invention

The present invention relates to a manually held record cleaner that is slidably engaged with a phonograph record to clean dust accumulation from the record grooves and to remove static electrical charge from the record.

2. Description of the Prior Art

Manually held record cleaners are used to remove dust accumulation from record grooves and to also remove static electrical charge from records being cleaned. These cleaners have heretofore utilized soft pile material for cleaning the records and have also incorporated brushes used to loosen and remove the dust accumulation. When soft pile material is utilized, cleaning is most effectively performed by dampening the material with a cleaning solution so that static electrical charge is also removed from the record. However, the degree to which the pile material is dampened is best limited in order to prevent to cleaning liquid from remaining on the record after the cleaning. Also, one commercially available record cleaner includes flexible folds of soft pile material positioned on opposite sides of a brush. A problem with this cleaner is that the folds of pile material collapse and do not perform effective cleaning in cooperation with the brush.

United States patents disclosing record cleaners are as follows, U.S. Pat. Nos.: 2,322,470; 3,229,321; and 3,534,425.

SUMMARY OF THE INVENTION

An object of the present invention is to provide an improved manual record cleaner capable of effectively cleaning phonograph records and removing statical electrical charge during the cleaning.

In carrying out the above object, a preferred embodiment of the record cleaner includes a manually held body having rigid leading and trailing projections spaced from each other. A covering of each projection is made from a soft pile material to provide the cleaning action. A receptacle with a first compartment for receiving the leading projection and a second compartment for receiving the trailing projection includes absorbent material within the first compartment for creating an atmosphere of a cleaning liquid when the liquid is applied thereto in order to dampen the pile covering of the leading projection with the proper amount of the cleaning liquid. During use, the leading projection removes dust accumulation from the record grooves as well as static charge from the record while the trailing projection removes any remaining dust accumulation and dampness on the record.

A static charge dissipating member is supported on the cleaner body between the projections and extends from the body a lesser distance than the projections so as to be spaced from a record being cleaned. The charge dissipating member may be made from an electrically conductive noncapacitive material, from a magnetic member, or from a carbon member in order to provide its static charge dissipating function. Preferably, the charge dissipating member is located adjacent the trailing projection and a brush is mounted on the body adjacent the leading projection. Bristles of the brush extend from the body a slightly greater distance than the projections so as to loosen dust accumulation from the grooves of a record being cleaned. When the cleaner is mounted on the receptacle, the brush and the static charge dissipating member are located within the second compartment with the trailing projections.

In its preferred form, the cleaner body, the projections, the brush, and the charge dissipating member as well as the receptacle have an elongated shape of a sufficient length for cleaning all of the grooves of conventional size records during one pass. Molded plastic construction, preferably of a clear plastic, is used to form the cleaner body, the projections, and the receptacle. One end of the elongated receptacle includes outer compartments that function as holders for a brush used to clean the pile coverings of the projections and for a bottle that contains cleaning liquid. The projections covered by the soft pile preferably have blunt ends that engage the records being cleaned and tapered bodies extending to the blunt ends from the cleaner body. An indication on the cleaner body in the form of an arrow aids a user in properly orienting the cleaner during use by pointing toward the center of a record being cleaned.

The objects, features and advantages of the present invention are readily apparent from the following detailed description of the preferred embodiment taken in connection with the accompanying drawings.

BRIEF DESCRIPTION OF THE DRAWINGS

FIG. 2 is a top plan view of a record turntable assembly showing the cleaner being used to clean a record;

FIG. 3 is a sectional view taken through the cleaner along line 3—3 of FIG. 2;

FIG. 4 is a view of the lower side of the cleaner taken along line 4—4 of FIG. 3; and FIG. 5 is a sectional view through the cleaner and a mounting receptacle thereof taken along line 5—5 of FIG. 1.

DETAILED DESCRIPTION OF THE PREFERRED EMBODIMENT

Figure 1:
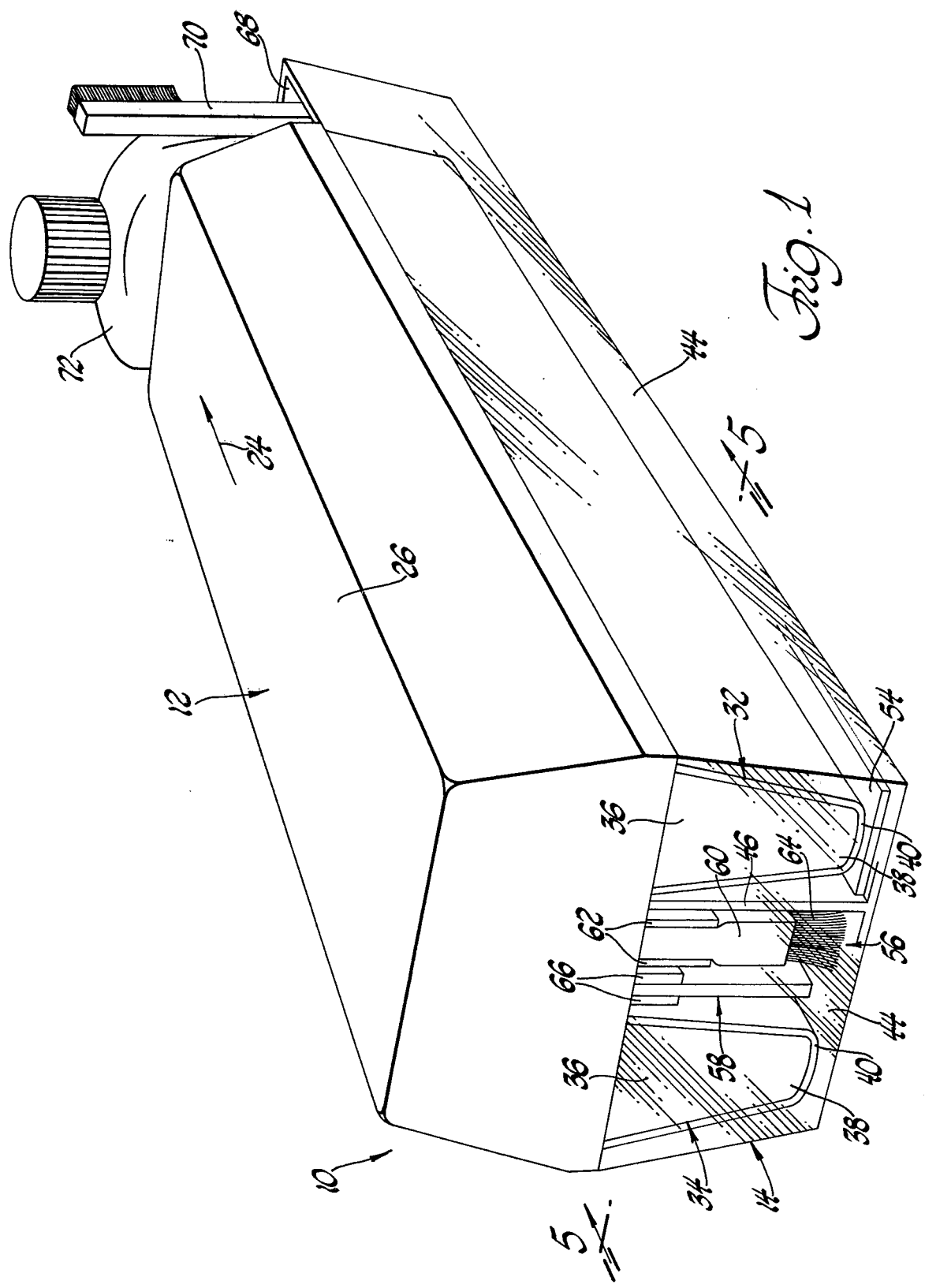
FIG. 1 is a perspective view of a manual record cleaner embodying the present invention.

Referring to FIG. 1 of the drawings, a manual record cleaner according to the present invention is collectively indicated by 10 and includes a molded plastic body 12 that is supported by a mounting receptacle 14 when the cleaner is not being used. During use, as seen by additional reference to FIG. 2, the cleaner body 12 is held by a user's hand 16 over a record 18 on a revolving turntable 20. As the turntable 20 is rotated by its associated turntable assembly 22 in a conventional manner so that the record 18 revolves in the direction of arrow A, the record cleaner 10 is engaged with the record to remove dust accumulation from the record grooves and to also remove static electrical charge from the record in a manner that is subsequently described. Proper orientation of the cleaner is achieved by an indication on the body 12 in the form of an arrow 24 pointing toward the center of the record. It should be noted that the cleaner is of an elongated construction so that all of the grooves of the record can be cleaned during a single pass although several passes are preferably made to provide the most effective cleaning. Also, although the preferred operation is to hold the cleaner against a rotating record, it is also possible to move the cleaner as the record is held stationary.

With combined reference to FIGS. 3-5, the cleaner body 12 includes an upper hollow member 26 of molded clear plastic that opens downwardly and receives a molded clear plastic lower member 28 of the body. Rectangularly shaped engaged interfaces 30 of the upper and lower body members 26 and 28 are secured to each other during assembly in any suitable manner such as by an adhesive or heat bonding. Rigid leading and trailing cleaning projections 32 and 34 of an integral construction extend downwardly from the lower member 28 of the cleaner body in a spaced relationship with respect to each other at opposite lateral sides of the cleaner. Each projection includes a downwardly tapered body 36 having a lower blunt end 38 and a covering 40 of a soft pile material secured thereto in any suitable manner such as by an adhesive. The soft pile material used for the coverings is of the type conventionally used with record cleaners and has a fine nap of small fibers capable of effectively cleaning record grooves. Orientation of the indicating arrow 24 in its inwardly pointing direction shown in FIG. 2 properly locates the cleaner 10 so that the leading projection 32 first engages the record grooves and the trailing projection 36 subsequently engages the record grooves during cleaning for a purpose that is described later.

When the cleaner body 12 is mounted by the receptacle 14 in the manner shown by FIG. 5, peripheral flanges 42 of the upper cleaner body member 26 engage upper edges of side and end walls 44 of the receptacle. An elongated intermediate wall 46 of the receptacle extends between the end walls 44 upwardly from a bottom wall 48 to define first and second compartments 50 and 52. Leading projection 32 is received within the first compartment 50 in the mounted relationship shown while the trailing projection 34 is received within the second compartment 52. A strip of absorbent material 54 is secured within the first compartment 50 on the bottom receptacle wall 48 and is located in a spaced relationship from the soft pile covering 40 on the lower blunt end 38 of the leading projection 32. Cleaning liquid applied to the absorbent material creates an atmosphere of the cleaning liquid within the first compartment 50 and thereby dampens the pile covering 40 of the leading projection 32 without applying excessive liquid to this covering.

During cleaning as shown in FIG. 2, the dampened leading projection 32 first engages the record grooves as the record is rotated into the cleaner and removes dust accumulation from the grooves as well as static electrical charge from the record. The dry soft pile covering 40 of the trailing projection 34 removes any remaining dust accumulation from the record grooves as well as any dampness that may remain on the record from the cleaning liquid. Since the soft pile covering 40 of the leading projection 32 is not excessively dampened, as previously discussed, the pile covering 40 of the trailing projection 34 remains essentially dry during use so as to be capable of effectively removing any dampness that may be transferred to the record being cleaned. Several drops of cleaning liquid applied to the absorbent material 54 will last for a week or so in creating an atmosphere sufficient for dampening the leading projection covering 40 sufficiently for providing effective cleaning and static charge removal. It initially takes the leading projection a half hour or so within the first receptacle compartment 50 in order for the cleaning liquid atmosphere therein to dampen the covering from a dry condition. The cleaner 10 may then be picked up from the receptacle 14 and used in the manner that has been described to provide effective cleaning.

With continuing reference to FIGS. 3-5, a brush 56 and an electrical static charge dissipating member 58 are located between the leading and trailing projections 32 and 34. Brush 56 is located closer to the leading projection 32 and includes a bristle holder 60 that is mounted between downwardly extending integral flanges 62 of the cleaner body lower member 28. Bristles 64 of the brush extend downwardly from the holder 60 away from the cleaner body for a distance just slightly greater than the cleaning projections 32 and 34, i.e. on the order of 0.005 of an inch or so. During cleaning, the brush bristles 64 engage the record grooves and loosen dust accumulation therein to cooperate with the pile coverings 40 of the projections in cleaning the record. Since the cleaning projection bodies 36 are of a rigid construction, the degree to which the brush bristles extend into the grooves is accurately controlled so that effective cleaning can be achieved without damaging the sound track surfaces within the record grooves.

Static electrical charge dissipating member 58 is located between the brush 56 and the trailing projection 34 as shown in FIGS. 3-5 and has an upper end mounted between integral downwardly extending flanges 66 on the cleaner body lower member 28. The charge dissipating member 58 extends downwardly from the cleaner body for a distance slightly less than the downwardly projecting cleaning projections 32 and 34, i.e. on the order of about one-eighth of an inch. This member may be made from electrically conductive, noncapacitive material, from a magnetic material, or from a carbon material. Each of these materials have been found effective in cooperating with the dampened leading projection 32 in removing static electrical charge from the record. Likewise, any static electrical charge that may be applied to the record by the brush 56 is also removed by member 58 and, if the leading projection 32 for some reason is dry, the member 58 will itself provide the charge dissipating function during cleaning.

As seen in FIG. 1, the receptacle 14 includes outer end compartments 68 (only one shown) that function as holders for a second brush 70 used to clean the cleaning projection coverings 40 and for a bottle 72 containing cleaning liquid. Complete and effective cleaning of records can thus be achieved without the necessity of any other cleaning tools or materials than those of the cleaner 10 disclosed.

While the preferred embodiment of the cleaner has herein been disclosed, those skilled in the art will recognize various alternative designs and embodiments for practicing the present invention as defined by the following claims.

What is claimed is:

1. A manual record cleaner comprising: a manually grasped body having leading and trailing projections spaced from each other; each projection being of a rigid material and having a blunt end including a covering of a soft pile for cleaning records during relative movement between the cleaner and the records while in an engaged condition; a brush located between the leading and trailing projections in a spaced relationship to each projection; said brush having bristles that extend away from the body to a plane extending between the soft pile covered blunt ends of the rigid projections so as to loosen dust accumulation from a record being cleaned with the projection coverings slidingly engaging the record; said brush bristles having a flexible length that is a plurality of times the thickness of the soft pile coverings on the blunt ends of the rigid projections; the rigid blunt ends on the projections and the pile coverings thereon cooperating to control the degree to which the bristles extend into the record grooves so that effective cleaning can be achieved without damaging the sound track surfaces of the record grooves; and an upwardly opening receptacle for mounting the cleaner body with the projections and brush projecting downwardly thereinto, said cleaner body closing the receptacle when mounted thereon to retain any cleaning liquid dampness that may be present on either projection covering.

2. A manual record cleaner comprising: a manually grasped body having leading and trailing projections spaced from each other; each projection being of a rigid material and including a covering of a soft pile for cleaning records during relative movement between the cleaner and the records while in an engaged condition; and a receptacle for supporting the cleaner, said receptacle including a first compartment for receiving the leading projection and a second compartment for receiving the trailing projection, and the first compartment including absorbent material spaced from the pile covering of the leading projection such that cleaning liquid applied to the absorbent material creates an atmosphere of the cleaning liquid within the first compartment to dampen the pile covering of the leading projection with the proper amount of cleaning liquid whereby the leading projection is dampened with the cleaning liquid without dampening the pile covering of the trailing projection such that dust accumulation and static charge are removed from the records by the dampened pile covering of the leading projection and any remaining dust accumulation and dampness on the record are removed by the pile covering of the trailing projection.

3. A cleaner as in claim 2 further including a brush and a static charge dissipating member located between the spaced projections so as to be received within the second compartment of the receptacle, said brush being spaced adjacent the leading projection and having bristles that extend from the cleaner body past the rigid projections to engage a record being cleaned and loosen dust accumulation therefrom, and said static charge dissipating member being located adjacent the trailing projection and extending from the cleaner body a lesser distance than the projections so as to be spaced from the record during cleaning to remove static charge therefrom.

4. A cleaner as in claim 3 wherein the projections have blunt ends that engage the records and tapered bodies extending to the blunt ends from the cleaner body.

5. A cleaner as in claim 4 wherein the cleaner body, the projections, and the receptacle are of a molded plastic construction.

6. A cleaner as in claim 5 wherein the molded plastic receptacle includes cleaning brush and bottle holders.

7. A manual record cleaner comprising a manually grasped body having projections spaced from each other; each projection being of a rigid material and including a covering of a soft pile for cleaning records during relative movement between the cleaner and the records in a direction from one projection to the other while the projections engage the records; and a static charge dissipating member supported by the cleaner body between the projections and extending from the cleaner body a lesser distance than the projections so as to be spaced from a record being cleaned.

8. A cleaner as in claim 7 further including a brush supported by the cleaner body between the projections, and said brush including bristles that extend from the cleaner body a greater distance than the projections so as to engage a record being cleaned to loosen dust accumulation.

9. A manual record cleaner comprising a manually grasped body having leading and trailing projections spaced from each other; each projection being of a rigid material and including a covering of a soft pile for cleaning records during relative movement between the cleaner and the record while in an engaged condition; a brush supported by the cleaner body between the projections located adjacent the leading projection; said brush including bristles that extend from the cleaner body a greater distance than the projections so as to loosen dust accumulation from a record being cleaned; a static charge dissipating member supported on the cleaner body between the brush and the trailing projection; said static charge dissipating member extending from the cleaner body a lesser distance than the projections so as to be spaced from records during cleaning to remove static charge therefrom; a receptacle for supporting the cleaner; said receptacle including a first compartment for receiving the leading projection and a second compartment for receiving the trailing projection as well as the brush and static charge dissipating member; and absorbent material within the first compartment located in a spaced relationship to the pile covering of the leading projection such that cleaning liquid applied to the absorbent material creates an atmosphere of the cleaning liquid within the first compartment to dampen the pile covering of the leading projection with the proper amount of cleaning liquid, said leading projection removing dust accumulation and static charge from a record being cleaned while the trailing projection removes any remaining dust accumulation and cleaning liquid therefrom and the brush concomitantly loosens the dust accumulation as the static charge dissipating member also removes static charge from the record.

10. A cleaner as in claim 9 further including an indication on the cleaner body of the orientation in which the cleaner is to be held relative to records during cleaning.

11. A cleaner as in claim 10 wherein the indication includes an arrow on the body that points toward the center of a record being cleaned when the cleaner is properly oriented.

12. A manual record cleaner comprising an elongated molded plastic body that is manually grasped and includes elongated leading and trailing projections; each projection including a blunt end and a tapered body extending from the cleaner body; a soft pile covering secured over the blunt end of each projection so as to clean records during relative movement between the cleaner and the records while in an engaged condition; an elongated brush supported by the cleaner body between the projections located adjacent the leading projection; said brush including bristles that extend from the cleaner body a greater distance than the projections so as to loosen dust accumulation from a record being cleaned; an elongated static charge dissipating member supported on the cleaner body between the brush and the trailing projection; said static charge dissipating member extending from the cleaner body a lesser distance than the projection so as to be spaced from records during cleaning to remove static charge therefrom; an elongated receptacle for supporting the cleaner; said receptacle including a first compartment for receiving the leading projection and a second compartment for receiving the trailing projection as well as the brush and static charge dissipating member; absorbent material received within the first compartment located in a spaced relationship to the pile covering of the leading projection such that cleaning liquid applied to the absorbent material creates an atmosphere of the cleaning liquid within the first compartment to dampen the pile covering of the leading projection with the proper amount of cleaning liquid; said leading projection removing dust accumulation and static charge from a record being cleaned while the trailing projection removes any remaining dust accumulation and cleaning liquid therefrom and the brush concomitantly loosens the dust accumulation as the static charge dissipating member also removes static charge from the record; a second brush for cleaning the pile coverings of the projections; a bottle for cleaning liquid; and holders on the receptacle for the second brush and the bottle.

13. A manual record cleaner comprising: a manually grasped body having leading and trailing projections spaced from each other; each projection being of a rigid material and having a blunt end including a covering of a soft pile for cleaning records during relative movement between the cleaner and the records while in an engaged condition; a brush located between the leading and trailing projections in a spaced relationship to each projection; said brush having bristles that extend away from the body to a plane extending between the soft pile covered blunt ends of the rigid projections so as to loosen dust accumulation from a record being cleaned with the projection coverings slidingly engaging the record; said brush bristles having a flexible length that is a plurality of times the thickness of the soft pile coverings on the blunt ends of the rigid projections; and the rigid blunt ends on the projections and the pile coverings thereon cooperating to control the degree to which the bristles extend into the record grooves so that effective cleaning can be achieved without damaging the sound track surfaces of the record grooves.

14. A manual record cleaner comprising: a manually grasped body having leading and trailing projections spaced from each other; each projection being of a rigid material and having a blunt end including a covering of a soft pile for cleaning records during relative movement between the cleaner and the records while in an engaged condition; a brush located between the leading and trailing projections in a spaced relationship to each projection; said brush having bristles that extend away from the body to a plane extending between the soft pile covered blunt ends of the rigid projections so as to loosen dust accumulation from a record being cleaned with the projection coverings slidingly engaging the record; said brush bristles having a flexible length that is a plurality of times the thickness of the soft pile coverings on the blunt ends of the rigid projections; and the rigid blunt ends on the projections and the pile coverings thereon cooperating to control the degree to which the bristles extend into the record grooves so that effective cleaning can be achieved without damaging the sound track surfaces of the record grooves; and an additional record treating component located between the brush and one of the projections.

* * * * *